Feb. 17, 1953   H. P. FRY, JR   2,628,409
THREAD-ADVANCING REEL
Filed Sept. 20, 1950   3 Sheets-Sheet 1
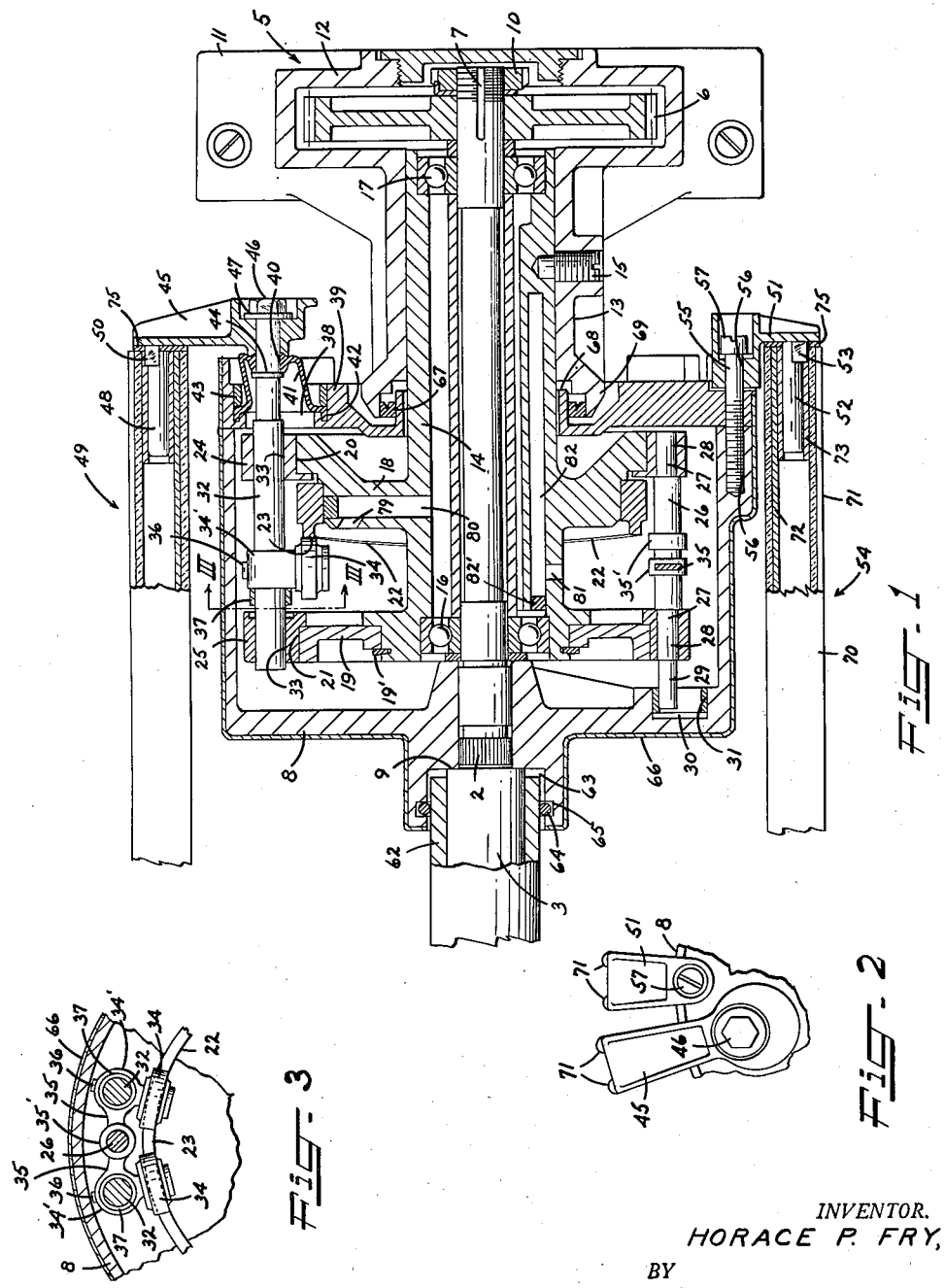
INVENTOR.
HORACE P. FRY, JR.
BY
Thomas R. O'Malley
ATTORNEY

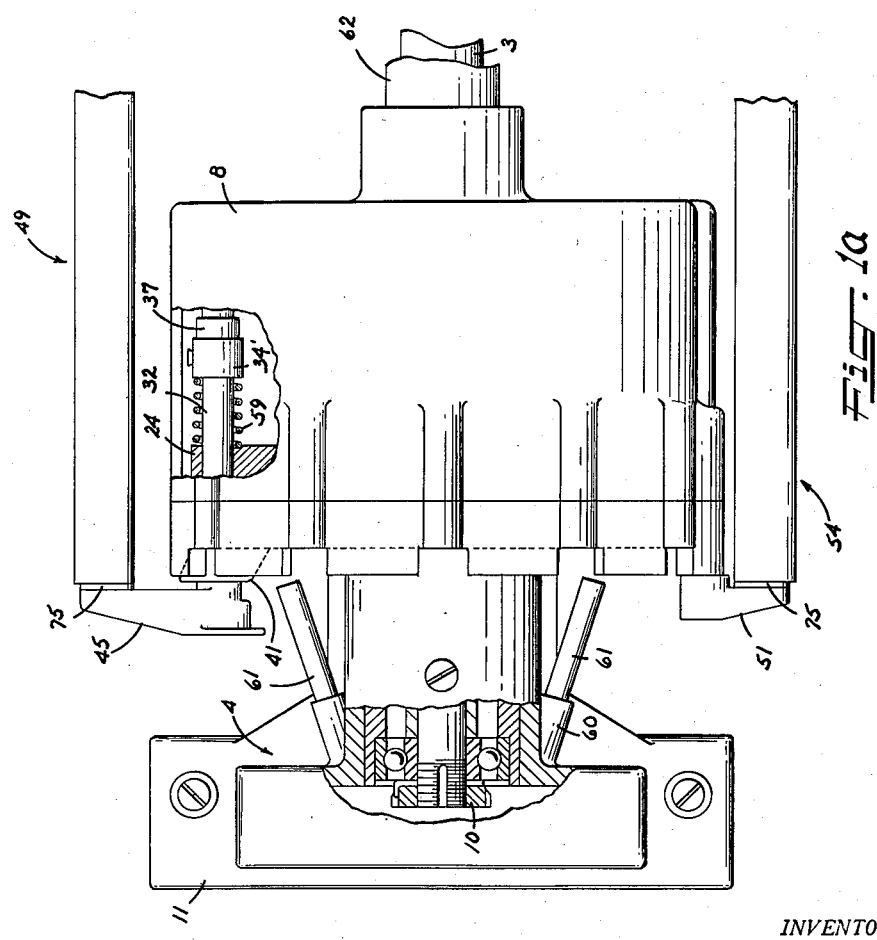

Feb. 17, 1953   H. P. FRY, JR   2,628,409
THREAD-ADVANCING REEL
Filed Sept. 20, 1950   3 Sheets-Sheet 3
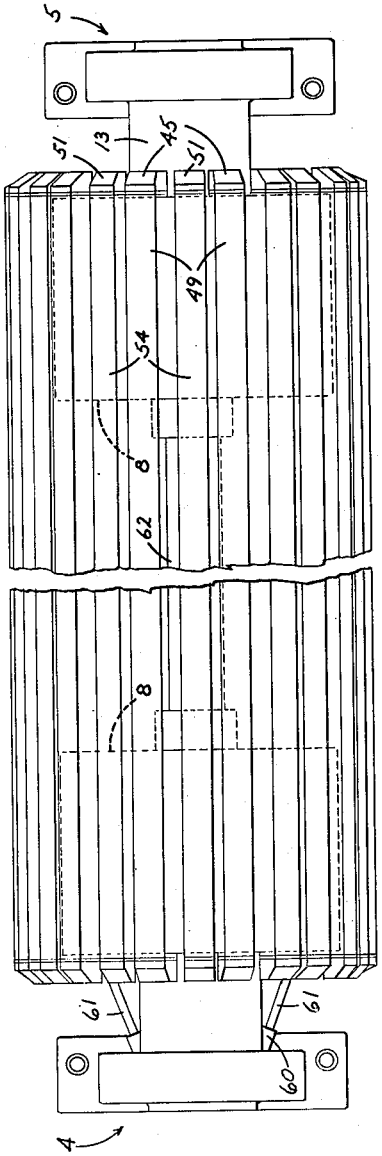
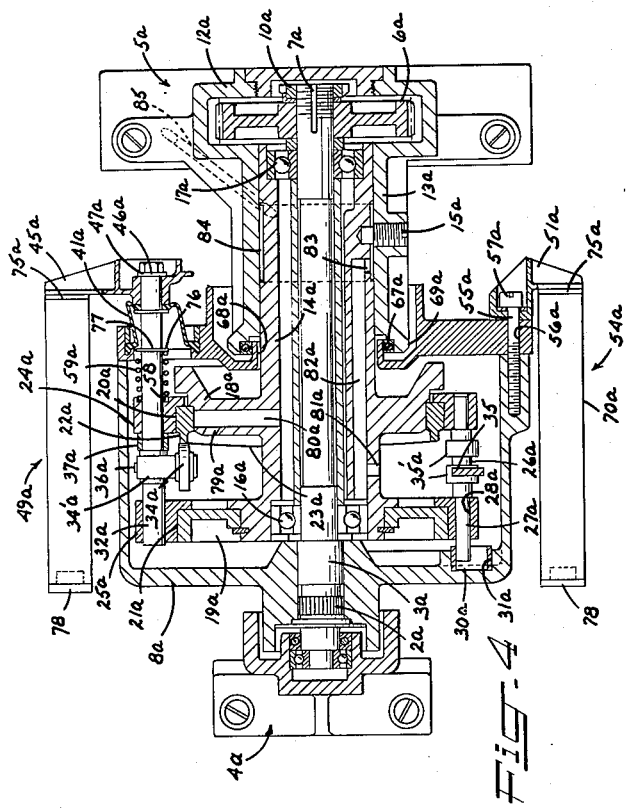
INVENTOR.
HORACE P. FRY, JR.
BY
Thomas B. O'Malley
ATTORNEY.

Patented Feb. 17, 1953

2,628,409

UNITED STATES PATENT OFFICE 2,628,409

THREAD-ADVANCING REEL

Horace P. Fry, Jr., Swarthmore, Pa., assignor to American Viscose Corporation, Wilmington, Del., a corporation of Delaware Application September 20, 1950, Serial No. 185,761

16 Claims. (Cl. 28—71.6)

This invention relates to thread-advancing reels and is particularly concerned with an improvement in the construction thereof for the purpose of reducing the amount of material required for either a short reel or a long, high storage capacity type of reel adapted to carry a yarn, thread, or other type of strand through a generally helical path for the purpose of supporting the strand in a compact but readily available form in which it may be subjected to various treatments, such as by means of liquids, gases or fluids in general.

It is the primary object of the present invention to provide an improved and simplified construction of thread-advancing reel which is made as light in weight as possible and of as few parts as possible consistent with efficient and reliable operation. By the present construction, the reduction in weight and in number of parts resulting a saving in operating expense, less laborious dismantling in case of repair, and lower initial cost. Other objects and advantages will be apparent from the drawing and the description thereof hereinafter.

In the drawing, which is illustrative of the invention,

Figure 1 is a longitudinal section through the right end of a long thread-advancing reel in accordance with the invention, Figure 1a is a longitudinal section through the left end of the reel of Figure 1, Figure 2 is an end view of the bar supporting brackets, Figure 3 is a section taken on line III—III of Figure 1, Figure 4 is an axial section through a preferred embodiment of a short form of reel in accordance with the invention, and Figure 5 is a face view of a long reel one end of which is shown in Figure 1.

In general, the reel of the present invention comprises a central, rigid, one-piece shaft which extends the length of the reel and may be supported directly in external bearings at one or both ends, preferably at both. It also comprises two sets of bars which interdigitate with one another, one set being concentric with respect to the shaft, and the other being eccentric with respect thereto.

In a short reel, the bar actuating mechanism is protected by a single housing which is rigidly secured to the shaft and is disposed within the cage of bars. The housing is cup-like in shape with an open end facing one end of the reel and provided with a closure which is rigidly secured to the housing, preferably by the same means that is provided for rigidly securing one set of the bars on the housing. The bars are preferably hollow in construction and those of one set are rigidly attached adjacent one end to the housing, preferably by individual radially extending brackets. The actuatable bars are individually attached by radially extending brackets to independently reciprocable rods which extend through openings in the housing cover into cooperative relationship with the driving mechanism in the housing. Individual flexible sealing means, such as grommets, are provided between the openings in the covers and the reciprocable rods.

In a long reel, the construction comprises a pair of spaced housings or casings rigidly secured to the central shaft, one at each end of the reel, and disposed inside of the cage formed by the bars. They serve both to support one set of the bars and to protect the driving mechanism for actuating the other set of bars as in the short reel. These housings are cup-like in shape with their open ends facing the ends of the reel and provided with suitable closures which, like the housings, rotate with the reel. The bars are preferably hollow in construction and those of one set are rigidly attached adjacent their ends to the housings, preferably by individual brackets. The bars of the actuatable set are individually attached to independently reciprocable rods which extend through openings in the covers to the casings into cooperative relationship with the driving mechanism therein. A protective sleeve is provided for the shaft between the housings and flexible sealing means is provided between the reciprocable rods and the covers to the housings to thereby protect the driving mechanism therein from any corrosive fluids or atmosphere in proximity to which the reel may operate.

As shown in Figs. 1, 1a, 2, 3 and 5 of the drawing, the reel when of considerable axial length comprises a central, rigid, one-piece shaft 3 which extends through bearings 4 and 5 adjacent opposite ends thereof. A driving gear 6 is keyed to the shaft at 7. At each end of the shaft, there is provided a housing 8 and these housings are similar in construction and preferably identical so that they may be interchangeable. The shaft 3 is provided with shoulders 9 against each of which one of the housings 8 is held. A straight line knurl 2 is provided on the shaft adjacent each shoulder 9 and the hub of the housing 8 is forced on the shaft over the knurling which causes some displacement of material in the portion of the bore of the hub through which the knurling is pressed, thereby rigidly securing the housings on the shaft. A nut 10 at each end of the shaft serves to hold not only the driving gear 6, but also the bar-actuating mechanisms, within the housings 8, in position on the shaft.

The bearings 4 and 5 specifically shown are provided with laterally projecting bosses or flanges 11 by which they may be fastened, as by bolts or cap screws, to parallel frame members, such as upright, horizontal or otherwise inclined I-beams or channels. The bearing 5 is formed with a casing 12 which is adapted to surround the driving gear 6 except for a portion of its periphery extending back of the plane of flanges 11 as viewed in Fig. 1. A sleeve 13 extends laterally from the casing 12 and within the sleeve there is provided a cam-supporting member 14 which is fixedly secured to the bearing 5 by the set screw 15 and supports the shaft 3 rotatably within the ball bearings 16 and 17 which are preferably widely spaced to provide accurate and reliable alignment of the member 14. The support 14 carries two radially projecting spiders 18 (integral therewith) and 19 (rigidly held by snap ring 19') which are provided with peripheral bearing surfaces 20 and 21 respectively which are eccentric with respect to the shaft 3. The web 18 also carries fixedly secured thereon a cam 22 which has a laterally facing cam surface 23. A rotatable support comprising two flanged rings 24 and 25 is rotatably mounted upon the surfaces 20 and 21. A plurality of shouldered tie-rods 26 have smaller-diameter projecting end portions 27 which fit within bores 28 in the rings 24 and 25 and hold them together in rigidly spaced relationship. Portions 27 may be press-fitted into bores 28 or the portion 27 at opposite ends of each tie-rod 26 may be oppositely threaded and thereby screwed into bores 28. Each of the rods 26 has a smaller-diameter portion 29 extending into corresponding recesses 30 within the housing 8, which may be lined with bushings 31 to provide a better bearing surface for the pins 29. A plurality of rods 32 are reciprocably mounted within other bores 33 in the rings 24 and 25. On each of rods 32 there is mounted a cam-follower roller 34 by means of a link 35 (see Fig. 3) having collars at each end, one of which designated 34' surrounds rod 32 and is fixed thereon, as by a set screw 36, and the other of which designated 35' surrounds an adjacent tie-rod 26. An additional collar 37 may be positioned upon each rod 32 to back up the collar 34' to give it additional support. The outer ends of the rods 32 project through openings 38 in the cover 39 for the housing 8 and through openings 40 in the individual flexible sealing members or grommets 41, each of which is secured in a suitable recess 42 adjacent openings 38 by means of a lock ring 43. An enlarged bead is provided in the flexible sealing member around the opening 40 and this bead is held tightly between a shoulder 44 on the rod 32 and the individual bracket 45 which is held upon the outer end of rod 32 by means of the nut 46 and suitable locking means, such as a lock washer 47. The individual bracket 45 extends radially outwardly from the rod 32 and has an axially projecting pin 48 which fits within a suitable recess in a bar 49 of the actuatable set. Each rod 32 is thus individually connected rigidly to one of the actuatable set of bars 49. A lug 50 secured to the bracket 45 serves to orient the bar properly with respect to the reel axis and to prevent any improper disposition of the bar when replacement is made.

The concentric or non-actuatable set of bars is secured to the housings 8 by suitable means at each end of the bar which, as shown, comprises the radially extending bracket 51 having pins 52 and registering lugs 53 adapted to extend into suitable recesses in the end of the bars 54. A cap screw 55 extends through a suitable bore 56 in the bracket 51, through a bore in the cover 39, and threadedly engages the bore 56 extending axially in the outer circumference of the housings 8. The seat for the head 57 of the cap screw is preferably recessed as shown so that a suitable calking material may be used, if desired, to fill in around the cap screw to protect it from corrosion. A similar recess may be provided for the nuts 46 in the brackets 45.

The supports for the two sets of bars at the other end of the reel are identical in construction. However, a compressed helical spring 59 is disposed on each of the reciprocable rods 32 between the fixed collar 34' (which, however, does not carry a follower roller 34) and the ring 24 so as to urge the cam follower rollers 34 at the other end of the reel against the cam surface 23. In other words, the cam and cam follower rollers within the housing 8 at the right end of the reel are omitted at the left end of the reel and replaced with spring means for urging the bars in such a direction that the cam followers 34 are at all times pressed against the cam. At both ends of the reel, rods 32 are reciprocable within the rings 24 and 25, the reciprocating action depending upon the cam surface 23 and the springs 59.

The fixed bearing housing 4 at the left end of the reel, as viewed in Fig. 1a, is provided with a plurality of bosses 60 into which pins 61 are screwed at an inclination such that the effective circumference of any windings about the pins is larger adjacent the reel proper and the circumference decreases in the direction away from the ends of the reel bars. These inclined rods 61 are provided at the discharge end of the reel so that any convolutions of yarn which are discharged from the reel bars over their ends fall upon the pins 61 and tend to move away from the reel until an operator can conveniently remove them.

A corrosion-resistant shell or sleeve 62, such as of saran or stainless steel, surrounds the central portion of the shaft 3 and extends into recesses 63 within the housings 8. A flexible sealing ring 64 of corrosion-resistant material, preferably elastic, such as rubber or a synthetic rubber, is disposed between the sleeve 62 and an annular groove 65 in the housings 8 and serves to prevent the entry of a corrosive atmosphere or liquid into the working parts of the reel. The housings 8 may be provided with a corrosion-resistant protective coating 66. The covers 39 and the brackets 45 and 51 may be made of a corrosion-resistant material and a flexible sealing ring 67 is provided between an outwardly projecting flange 68 on the cover and an overlapping or overhanging inwardly projecting flange 69 on the hub of the bearing housing 5.

While the reel bars may be made of any suitable material, preferably corrosion-resistant and may be solid or hollow, it is preferred that a hollow type of bar be used in order to save weight while at the same time maintaining the strength necessary for carrying the large number of convolutions of thread or yarn a long reel is intended to support. The reel bars shown may comprise a hollow glass bar 70 having longitudinally of its edges a pair of ridges 71 to reduce the contact of the thread against the outer periphery or face of the bars. An internal supporting channel-shaped shell 72 is disposed within the hollow bar and to this internal shell a fitting 73 is welded at each end. This fitting 73 is bored to receive the pins 48 or 52 extending from the brackets 45 or 51. Flexible sealing gaskets 75 are provided at each end of the bar between it and the face of the brackets to provide a resilient cushion against which the brackets may be tightened.

In operation, the gear 6 is driven from any suitable gear train not shown. This gear rotates shaft 3 which rotates the housings 8 and pins 29 cause rotation of the rings 24 and 25 within each of the housings. Rotation of the housings, of course, causes rotation of the concentric set of bars 54 which are attached directly to them and rotation of rings 24 and 25 cause the rotation of the eccentric set of bars 49. During rotation, each bar of the eccentric set alternately protrudes and recedes within the concentric set of bars and the cam 23 causes reciprocation of the actuatable bars individually in succession so that the bars advance the thread convolutions axially of the reel toward the discharge end thereof when the actuatable bars protrude from the concentric set and the actuatable bars are returned axially in their recessed positions in readiness for the next advance. During initial lacing operations of a machine comprising one or more such reels, it occasionally happens that some of the convolutions are pushed off the discharge end of the reel. When this occurs, the yarn convolutions fall around the pins 61 from which they may be removed at the convenience of the operator.

The reel construction of the present invention is extremely simple and has reduced weight as compared to other long reels designed for comparable thread tensions. Sealing elements are small in size and thereby the initial cost of the reel is greatly reduced because of the comparatively high cost of such items, particularly one of large size. The cost of maintenance of the present reel is low. Because of the individual mounting of the bars, each bar can be removed without disturbing any of the others and without dismounting the entire reel in case of the necessity of replacing a worn or damaged bar.

The short reel shown in Figure 4 is of similar construction and corresponding parts are designated by the same numeral as in the embodiment of Figs. 1 to 3 but with a postscript $a$. The outboard bearing 4a is simplified, and, if desired, may be omitted in which event the end of shaft 3a may be calked within the hub of housing 8a.

The cam 22a is mounted slightly differently than in Figs. 1 to 3, being provided itself with the bearing surface 20a. This modification of cam construction may be used in the long reel of Figs. 1 to 3 and the cam construction of Figs. 1 to 3 may be used in the reel of Fig. 4 as well. In Fig. 4, the spring 59a is disposed between the ring 24a (which may be provided with a recess 58 to receive one end of the spring) and a split ring or collar 76 fitting in a groove 77 in the rod 32a. The bars 49a and 54a are supported only at one of their ends and, if hollow (as shown), are provided with plugs or closures 78 at their other ends.

The bar-actuating mechanism of the reels of either embodiment shown may be lubricated either by a circulating system or by lubricant enclosed in the housing. In Figs. 1 to 3, a self-contained lubrication system is shown, bores 79, 80, 81, and 82 serving to provide intercommunication between the various chambers in each housing 8 and the bearings 16 and 17. The end of bore 82 is plugged at 82'. In Fig. 4, the additional oil-supply bore 85 can be connected to a suitable oil feeding device to direct continuously or at intermittent intervals additional oil to oil groove 84 from which it passes through bores 83, 82a, and 81a into the main chamber of the housing. Oil then flows into bore 79a and 80a into the annular space within support 14a from which it reaches bearings 16a and 17a.

It is to be understood that changes and variations may be made without departing from the spirit and scope of the invention as defined by the appended claims.

I claim:

1. A thread-advancing reel comprising a shaft, means for rotating the shaft, a housing for driving mechanism secured rigidly to the shaft, two sets of interdigitating bars, individual bracket members for fixedly securing one set of bars at their ends to the housing, a rotatable support in the housing rotatably mounted on an axis eccentric to that of the shaft, reciprocable rods mounted in the support generally parallel to the shaft, cam means for reciprocating the rods, and individual bracket members for securing the bars of the other set to the reciprocable rods.

2. A thread-advancing reel comprising a shaft, means for rotating the shaft, a housing for driving mechanism secured rigidly to the shaft, two sets of interdigitating bars, means for fixedly securing one set of bars at their ends to the housing, a stationary support in the housing having a pair of axially spaced annular bearing surfaces eccentric to the axis of the shaft, a rotatable support in the housing mounted on the pair of eccentric surfaces, reciprocable rods mounted slidably in the rotatable support generally parallel to the shaft, cam means in the housing between the bearing surfaces for reciprocating the rods, and means for securing the bars of the other set to the reciprocable rods.

3. Actuating mechanism for the eccentric set of bars of a thread-advancing reel which has both a concentric and an eccentric set of bars comprising a concentric driving shaft, a stationary support surrounding the shaft and having a pair of axially spaced webs each having an annular bearing surface eccentric to the axis of the shaft, a rotatable support comprising a pair of axially spaced rings mounted on the pair of eccentric surfaces, a cam secured to the stationary support between the webs, a plurality of rods axially slidably mounted in aligned openings in the rings, cam followers on the rods between the rings, and means for individually securing the bars to the rods.

4. Actuating mechanism as defined in claim 3 comprising similar stationary and rotatable supports within housings at both ends of the shaft, similar reciprocable rods in both rotatable supports, the cam means being provided in one of the housings, and spring means between the rings of the rotatable support in the other housing.

5. A thread-advancing reel comprising a shaft, means for rotating the shaft, a housing for driving mechanism secured at each end of the shaft for rotation therewith, two sets of interdigitating bars, means for fixedly securing one set of bars at their ends to the housings, a support in each housing rotatably mounted on an axis eccentric to that of the shaft, reciprocable rods mounted in each support generally parallel to the shaft, cam means for reciprocating the rods, and means for securing the bars of the other set to the reciprocable rods.

6. A reel as defined in claim 5 in which the means for securing the bars of both sets to the housings and rods respectively are individual bracket members.

7. A thread-advancing reel comprising a shaft, means for rotating the shaft, a housing for driving mechanism secured at each end of the shaft for rotation therewith, two sets of interdigitating bars, means for fixedly securing one set of bars at their ends to the housings, a stationary support in each housing each having a pair of axially spaced annular bearing surfaces eccentric to the axis of the shaft, a rotatable support in each housing mounted on the pair of eccentric surfaces, reciprocable rods mounted slidably in each rotatable support generally parallel to the shaft, cam means in one of the housings between the bearing surfaces for reciprocating the rods, and means for securing the bars of the other set to the reciprocable rods.

8. Actuating mechanism for the eccentric set of bars of a thread-advancing reel which has both a concentric and an eccentric set of bars comprising a concentric driving shaft, a stationary support surrounding one end of the shaft and having a pair of axially spaced webs each having an annular bearing surface eccentric to the axis of the shaft, a rotatable support comprising a pair of axially spaced rings mounted on the pair of eccentric surfaces, a cam secured to the stationary support between the webs, a plurality of rods axially slidably mounted in aligned openings in the rings, cam followers on the rods between the rings, and means for individually securing the bars to the rods.

9. A thread-advancing reel as defined in claim 5 in which the housings comprise cup-shaped members disposed with their open ends facing outwardly at the ends of the reel and covers for their open ends, said covers being provided with small spaced openings for permitting protrusion of the reciprocable rods therethrough, and individual flexible sealing means between each rod and the corresponding opening.

10. A thread-advancing reel as defined in claim 5 comprising a corrosion-resistant protective sleeve closely surrounding the shaft and extending between the housings, and a corrosion-resistant seal between the shaft and each housing.

11. A thread-advancing reel as defined in claim 5 in which the means for securing the bars of both sets to the housings and rods are disposed at the ends of the bars and the housings are entirely surrounded by the bars.

12. A thread-advancing reel as defined in claim 5 in which the bars are of hollow construction.

13. A protective system for the driving mechanism of thread-advancing reels which have a central driving shaft and both a concentric and an eccentric set of bars adapted to carry a strand in a helical path over the reel periphery comprising a pair of housings adjacent the ends of the shaft, a protective sleeve closely surrounding the shaft between the housings, and a seal at each juncture between the shaft and the housings.

14. Actuating mechanism for the eccentric set of bars of a thread-advancing reel which has both a concentric and an eccentric set of bars comprising a concentric driving shaft, a stationary support surrounding the shaft and having a pair of axially spaced webs each having an annular bearing surface eccentric to the axis of the shaft, a rotatable support comprising a pair of axially spaced rings mounted on the pair of eccentric surfaces, a cam secured to the stationary support between the webs, a plurality of rods axially slidably mounted in aligned openings in the rings, cam followers on the rods between the rings, spring means on the rods for urging the followers against the cam, and means for individually securing the bars to the rods.

15. A thread-advancing reel comprising a shaft, means for rotating the shaft, a housing for driving mechanism secured rigidly to the shaft, two sets of interdigitating bars, means for fixedly securing one set of bars at their ends to the housing, a rotatable support in the housing rotatably mounted on an axis eccentric to that of the shaft, reciprocable rods mounted in the support generally parallel to the shaft, cam means for reciprocating the rods, and means for securing the bars of the other set to the reciprocable rods, said housing comprising a cup-shaped member disposed with its open end facing outwardly at the end of the reel and a cover for the open end, said cover being provided with small spaced openings for permitting protrusion of the reciprocable rods therethrough, and individual flexible sealing means between each rod and the corresponding opening.

16. A thread-advancing reel comprising a shaft, means for rotating the shaft, a housing for driving mechanism secured at each end of the shaft for rotation therewith, two sets of interdigitating bars, means for fixedly securing one set of bars at their ends to the housings, a support in each housing rotatably mounted on an axis eccentric to that of the shaft, reciprocable rods mounted in each support generally parallel to the shaft, cam means for reciprocating the rods, means for securing the bars of the other set to the reciprocable rods, an end bearing for the reel shaft, and a plurality of inclined pins spaced circumferentially around said end bearing and diverging from the end bearing toward said housing, thereby providing a thread-receiving circumference of large diameter within the bars at the end of the reel and a circumference of small diameter beyond the ends of the bars.

HORACE P. FRY, JR.

REFERENCES CITED

The following references are of record in the file of this patent:

UNITED STATES PATENTS

| Number | Name | Date |
| --- | --- | --- |
| 2,414,644 | Gram | Jan. 21, 1947 |
| 2,415,115 | Stanley | Feb. 4, 1947 |
| 2,491,038 | Ewing | Dec. 13, 1949 |